United States Patent

Ashcraft

[15] 3,647,507

[45] Mar. 7, 1972

[54] RESIN COMPOSITION CONTAINING A POLYACRYLIC ACID-POLYACRYLAMIDE COPOLYMER AND METHOD OF USING THE SAME TO CONTROL RESIN COMPOSITION

[72] Inventor: Charles Ray Ashcraft, Salt Lake City, Utah

[73] Assignee: Johnson & Johnson

[22] Filed: Jan. 7, 1970

[21] Appl. No.: 1,299

[52] U.S. Cl. ..............................117/38, 117/47 R, 117/60, 117/161 UH, 117/161 UN
[51] Int. Cl. ...................................B44d 1/092, B44d 1/52
[58] Field of Search ............117/38, 161 UH, 161 UN, 47 R, 117/60; 260/29.6 RB

[56] References Cited

UNITED STATES PATENTS

| | | | |
|---|---|---|---|
| 3,536,518 | 10/1970 | Drelich | 117/38 |
| 2,992,943 | 7/1961 | Coover Jr. et al. | 117/161 UN |
| 3,476,580 | 11/1969 | Jinnette | 117/38 |

*Primary Examiner*—Ralph S. Kendall
*Assistant Examiner*—M. F. Esposito
*Attorney*—Alexander T. Kardos and Robert L. Minier

[57] ABSTRACT

A new resin composition comprising an emulsion polymerized resin, a surfactant, and a polyacrylic acid-polyacrylamide copolymer; and a method of controlling the deposition of such resin composition on porous, absorbent materials by giving it a pH of from about 7 to about 9, or greater, at which it is stable, and then depositing it on the porous, absorbent sheet materials which have a pH of below 7 and which possess sufficient acidity as to bring the pH of the resin composition deposited thereon to below 7, at which it is unstable, whereupon it immediately coagulates and immediately precipitates on the porous, absorbent sheet materials with a minimum of lateral spread or migration thereon.

13 Claims, No Drawings

RESIN COMPOSITION CONTAINING A POLYACRYLIC ACID-POLYACRYLAMIDE COPOLYMER AND METHOD OF USING THE SAME TO CONTROL RESIN COMPOSITION

Emulsion polymerized resins are widely used throughout many industries. They have found use in the coating and impregnating industries for the coating and impregnating of woven fabrics, nonwoven fabrics, paper, leather, and other relatively porous, absorbent materials. The resins are also used as adhesives for laminating materials such as sheets and films, or for bonding fibrous webs. These resins have also found wide use as additives in the manufacture of paper, cardboard, and other paper products, in the printing industry, and in many other industries.

In most instances, the resin is dispersed in water or an aqueous medium and, when applied from the aqueous dispersion, is carried by the water until the water ultimately is evaporated. If it is desired to place the resin only on the surface of porous, absorbent sheet materials, such materials unfortunately tend to absorb the water and undesirably carry the resin laterally as well as into the body of the material itself rather than keeping the resin merely on the surface. And, if such resins are used in bonding fibrous nonwoven fabrics, especially in intermittent print pattern bonding, the water tends to wick along the fibers and carry the resin with it not only laterally on the surface of the nonwoven fabric but also inwardly into the body of the nonwoven fabric. Thus, although placed originally in a specific and distinct intermittent print pattern, the pattern will spread laterally undesirably and migrate due to the diffusion of the water and resin until the water is ultimately evaporated.

I have now discovered a new resin composition and a manner for applying such resin composition to porous, absorbent materials so that the resin may be deposited in a controlled manner. If it is desired that the resin only be placed on the surface of porous, absorbent materials with minimal lateral spread or migration, then the composition and method of the present invention will allow this to be done. Also, if it is desired that the resin penetrate directly through the thickness of the porous, absorbent materials, again with minimal lateral spread or migration, adjustments can be made in the pressure of the application of the resin composition whereby this, too, can be done.

The resins which may be used in accordance with the present invention are the emulsion polymerized resins which are produced by emulsifying the monomers, stabilizing the monomer emulsion with a suitable surfactant system, and polymerizing the monomers in the emulsified state to form a solid resin polymer. The solid polymer is usually dispersed in the aqueous medium as discrete particles of colloidal dimensions and is generally termed a "resin emulsion" or a "latex."

In accordance with the present invention, I have discovered a new composition of a stable, emulsion polymerized resin dispersion having a pH of from about 7 to about 9 or greater and comprising from about 0.1 to 75 percent by weight of emulsion polymerized resin solids, from about 0.1 to 5 percent by weight of the resin solids of a surfactant, and from about 1 percent to about 10 percent by weight of the resin solids of a polyacrylic acid-polyacrylamide copolymer.

I have further discovered that, if the resin composition described is applied to porous, absorbent materials, its deposition may be controlled by preparing the resin dispersion in such a way that it possesses a pH of from about 7 to about 9 or greater, at which it is stable. This is followed by applying the resin dispersion to the porous, absorbent materials while substantially simultaneously lowering the pH of the resin dispersion to a value less than 7. For example, if it is desired to apply the resin dispersion merely to the surface of the porous, absorbent materials, the pH of the porous, absorbent materials is previously lowered to less than 7 and is provided with sufficient acidity so that the resin dispersion, when applied to the porous, absorbent material immediately drops in pH to less than 7 and immediately coagulates and precipitates and is deposited with a minimum of lateral spread or migration on the surface of the porous, absorbent material.

Following the application of the aqueous resin dispersion to the porous, absorbent materials, heating and drying is effected in a conventional manner either by passage through a heated drying oven or over heated rotating drying cans. Elevated temperatures of from about 200° F. to about 300° F. are normally employed for the drying operation. Higher temperatures may be used, where necessary, for example, where a higher temperature is needed for a resin curing operation.

Other variations, changes and modifications will, of course, be readily apparent to one skilled in the art.

THE EMULSION POLYMERIZED RESINS

The resins which may be used in the method of the present invention are the emulsion polymerized resins which are in the form of solid resin particles dispersed in a liquid which is usually water. These resin dispersions, or resin emulsions, as they are called, are stabilized by the surfactant system and the dispersion is stable at pH's of from about 7 to about 9, or higher. Suitable examples of such resins are the polyvinyl chlorides, polyvinyl acetates, polyvinyl chloride-polyvinyl acetate copolymers, polyacrylates such as methyl methacrylate, ethyl methacrylate, etc.; polyacrylate copolymers such as ethyl acrylate-methyl methacrylate copolymers; polyvinyl chloride-alkyl acrylate copolymers such as vinyl chloride-ethyl acrylate copolymers; polyvinyl acetate-alkyl acrylate copolymers such as vinyl acetate-methyl acrylate copolymers; polyurethanes; synthetic rubber latexes; etc.

The amount of the emulsion polymerized resins which is included in the aqueous resin composition may vary widely depending upon the particular resin used, and upon the needs and requirements of the particular use. Normally, from about 0.1 percent to about 75 percent by weight of emulsion polymerized resin solids are used, based on the weight of the aqueous resin composition. Preferably, the resin solids are used commercially in the lower ranges and are employed in amounts of from about 15 percent to about 50 percent by weight of the aqueous resin composition.

Generally, the particle size in the resin dispersions will flare-edged, from about one-tenth of a micron or smaller to about 3 to 5 microns in size.

THE SURFACTANTS a

The surfactant system may be anionic, cationic, or nonionic. Specific examples of suitable surfactants include: sodium and potassium salts of saturated fatty acids containing five to 18 carbon atoms; sodium alkyl sulfates containing six to 18 carbon atoms; sodium alkyl sulfonates containing six to 18 carbon atoms; sodium alkyl benzene sulfonates containing six to 18 carbon atoms; sodium 1-methyl alkyl benzene sulfonates in which the methyl alkyl group contains 12 to 18 carbon atoms; sodium di-alkyl sulfosuccinates in which each alkyl group contains four to 12 carbon atoms; sodium polyoxyethylene ether alcohol sulfates in which the alcohol contains 12 to 18 carbon atoms; triethanolamine salts of fatty acids; alkyl amine hydrochlorides; alkyl trimethyl ammonium bromides; di-alkyl dimethyl ammonium chlorides; polyoxyethylene mono alkyl ethers in which the alkyl group contains 12 to 18 carbon atoms; polyoxyethylene nonyl phenyl ethers; methoxy polyoxyethylene decanoates and dodecanoates; etc.

The amount of surfactant included in the aqueous resin composition will vary widely depending upon the particular resin used, the concentration of resin solids, and, in general, upon the needs and requirements of the particular situation. Normally, the surfactant is present in an amount of from about 0.1 percent to about 6 percent by weight of the resin solids. Preferably, however, the surfactant is present in an amount equal to from about 1 percent to about 5 percent of the weight of the resin solids.

THE POLYACRYLIC ACID-POLYACRYLAMIDE COPOLYMERS

The polyacrylic acid-polyacrylamide copolymer is usually available in the alkali metal or sodium salt form, is water soluble, has a molecular weight in the range of from about 100,000 to about 1,000,000 and preferably from about 300,000 to about 500,000, and possesses the following structural formula:

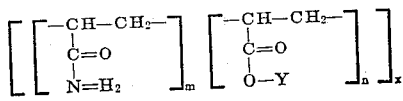

where
$m+n=100$
$m=10$ to 90
$n=90$ to 10
$y=$ a cation such as Na, K, Li, NH$_3$, or H.
$x=$ the number of monomeric units to keep the molecular weight in the range of from about 100,000 to about 1,000,000 and preferably from about 300,000 to about 500,000.

The amount of polyacrylic acid-polyacrylamide copolymer included in the aqueous resin composition will vary widely depending upon the particular resin used, the concentration of the resin solids and, in general, upon the needs and requirements of the particular situation. Normally, the polyacrylic acid-polyacrylamide copolymer will be present in an amount ranging from about 1 percent to about 10 percent of the weight of the resin solids. Preferably, such range is narrowed commercially to from about 2 percent to about 8 percent of the weight of the resin solids.

The degree of hydrolysis of the copolymer, as measured by the relative values of $m$ and $n$, ranges from about 10 percent to about 90 percent. Within the more commercial aspects of the present inventive concept, however, values of $m$ (the polyacrylamide portion) range from about 10 percent to about 70 percent and the values of $n$ (the polyacrylic portion) range from about 90 percent to about 30 percent.

The aqueous resin composition is formulated, as desired or required, and the pH is adjusted, if necessary, to bring it to about 7 or above, and preferably to a range of from about 7 to about 9, at which range the aqueous resin composition is stable. Ammonia is preferred to raise the pH to the desired basic or alkaline range inasmuch as it is readily used and easily volatilized from the product subsequent to application. Other basic or alkaline compounds, such as caustic, may be used where their presence is not objectionable.

THE POROUS ABSORBENT MATERIALS

The materials upon which the aqueous resin composition are deposited are porous or absorbent and are usually in sheet, film, web, or similar form. Specific examples of such materials include woven, nonwoven and knitted textile fabrics; paper and paper products; wood and wood products; leather; or other synthetic, manmade, or natural materials which are porous and absorbent. The preferred materials are of cellulosic origin, that is, cotton or rayon fibrous materials, paper and paper products, etc.

Other fibrous materials may, of course, be used, either completely by themselves or in various blends ½ proportions with other fibrous materials named herein. Such other fibrous materials include natural synthetic or manmade fibers such as wool, silk, etc.; acrylic fibers (Acrilan, Creslan, Orlon); modacrylic fibers (Dynel); polyester fibers (Dacron, Kodel); polyamide fibers (nylon 66, nylon 6, nylon 610, nylon 11); polyolefins (polyethylene, polypropylene); cellulose esters (cellulose acetate, cellulose triacetate); etc.

Before the aqueous resin composition is deposited on the surface of the porous, absorbent materials, such materials should be suitably prepared by a pretreatment with an acidic material to bring its pH to below 7 and to provide it with sufficient acidity so that when the aqueous resin composition is deposited thereon, the pH of the resin composition is substantially immediately brought to below 7.

Substantially any acidic material may be used to lower the pH of the porous, absorbent materials. Acetic acid and lactic acid are preferred inasmuch as they are less corrosive than the mineral acids such as hydrochloric acid, nitric acid, etc. Such latter acids are of use, however, but are less preferable. In the specific case of acetic acid which is preferred, the porous, absorbent materials are wet with aqueous acetic acid having a concentration in the range of from about 0.01 percent to about 5 percent.

When the resin composition is deposited on the porous, absorbent materials and its pH drops to the of range, which is practically immediately, the stability of the resin composition disappears, and coagulation and precipitation take place at once. The resin particles remain on the surface of the porous, absorbent materials where they are initially deposited and thus lateral side spread and migration is minimized.

In the event, however, that it is desired to have the binder resin print pattern penetrate completely through the porous, absorbent materials, then, such is accomplished by the use of additional pressure by the binder-applying applicator roll on the porous, absorbent materials. Thus, in the case of nonwoven fabrics, where an engraved rotogravure printing roll is used, then the pressure of roll application is increased whereby the resin binder is actually pressed through the body of the nonwoven fabric but again with minimized lateral spread or migration on the surface of the nonwoven fabric.

The invention will be described in greater particularity with reference to the deposition of the resin compositions on nonwoven fabrics but such is merely illustrative and not limitative of the broader aspects of the inventive concept. In the following examples which set forth specific details of the application of the principles of the present invention, such again is primarily illustrative.

EXAMPLE I

The aqueous emulsion polymerized resin comprises about 1,400 grams of a polyvinyl acetate resin emulsion containing 55 percent resin solids. This is equivalent to about 770 grams of resin solids (real). The emulsion also contains about 35 grams of dodecyl benzene sulfonate as the surfactant. This is equivalent to about 4½ percent surfactant based on the weight of the polyvinyl acetate resin solids. Approximately 190 grams of polyacrylic acid-polyacrylamide copolymer resin solution (10 percent solids) is added. This is equivalent to about 19 grams of polyacrylic acid-polyacrylamide copolymer resin solids or about 2½ percent by weight based on the weight of the polyvinyl acetate resin solids. The degree of hydrolysis is approximately 75 percent, that is, $m=25$ and $n=75$ in the herein-described formula. The molecular weight is about 300,000. Sufficient ammonia is added to bring the pH to about 8.

A carded fibrous web of 100 percent rayon fibers, 1½ denier and 1½ inches in staple length, is impregnated with a 0.25 percent aqueous solution of acetic acid to bring its pH to below 7.

The resin emulsion is printed with relatively firm pressure on the acid-treated fibrous web in an intermittent print pattern of four horizontal wavy lines per inch extending across the width of the carded fibrous web.

At the moment of printing, there is sufficient acidity in the acid-treated fibrous web to lower the pH of the resin emulsion to below 7 and to destroy the effectiveness of the surfactant emulsified system and to cause the resin particles to immediately coagulate and to immediately precipitate on the fibrous web with a minimum of lateral spread or migration.

The printed web is then dried on a series of rotating dry cans maintained at a temperature of about 270° F. intertwine The intermittent print pattern remains clearly and sharply defined and goes directly into and through the fibrous web, with very little lateral spread or migration.

EXAMPLE II casing

The procedures of Example I are followed substantially as set forth therein with the exception that the amount of polyacrylic aciddpolyacrylamide copolymer is reduced to about 11 grams which represents about 1½ percent by weight based on the weight of the polyvinyl acetate resin solids. The results are comparable, although it is noted that the sharpness and distinctness of the print pattern is not quite as good as in Example I. It is, nevertheless, commercially satisfactory.

EXAMPLE III ½

The procedures of Example I are followed substantially as set forth therein with the exception that the amount of polyacrylic acid-polyacrylamide copolymer is increased to about 27 grams which represents about 3½ percent by weight based on the weight of the polyvinyl acetate resin solids. The results are comparable and the sharpness and distinctness of the print pattern is outstanding and is improved over Example I.

EXAMPLE IV

The procedures of Example I are followed substantially as set forth therein with the exception that the amount of polyacrylic acid-polyacrylamide copolymer is increased to 38 grams which represents about 7 percent by weight based on the weight of the polyvinyl acetate resin solids. The results are generally comparable, although it is noted that the lateral spread or migration is practically negligible and the distinctness of the binder print pattern is very sharp.

EXAMPLE V

The procedures of Example I are followed substantially as set forth therein with the exception that the degree of hydrolysis is approximately 55 percent, that is, $m=45$ and $n=55$ in the herein-described formula. The results are comparable.

EXAMPLE VI

The procedures of Example I are followed substantially as set forth therein with the exception that the molecular weight is about 400,000. The results are comparable.

EXAMPLE VII

The procedures of Example I are followed substantially as set forth with the exception that less pressure is applied to the engraved rotogravure printing roll whereby the resin binder remains substantially completely on the surface of the nonwoven fabric. The intermittent print pattern of four lines is very sharp and very distinct and there is very little lateral spread or migration.

EXAMPLE VIII

The procedures of Example I are followed substantially as set forth therein with the exception that the acid used to acidify the fibrous web is a 0.5 percent aqueous solution of lactic acid. The results are comparable.

EXAMPLE IX

The procedures of Example I are followed substantially as set forth therein with the exception that the aqueous emulsion polymerized resin comprises about 1,740 grams of an ethyl acrylate-methyl methacrylate copolymer resin emulsion containing 46 percent resin solids. This is equivalent to about 800 grams of resin solids (real). The results are comparable.

EXAMPLE X

The procedures of Example IX are followed substantially as set forth therein with the exception that a cross-linking monomer, N-methylol acrylamide is added to the monomer included in the emulsion polymerization. The resulting polymer yields comparable results but requires additional heating to ensure curing of the resin.

EXAMPLE XI

The procedures of Example I are followed substantially as set forth therein with the exception that the aqueous emulsion polymerized resin comprises about 1,520 grams of a vinyl acetate-methyl acrylate copolymer resin emulsion containing 46 percent resin solids. This is equivalent to about 700 grams of resin solids (real). The results are comparable.

EXAMPLE XII

The procedures of Example I are followed substantially as set forth therein with the exception that the emulsion contains about 35 grams of dioctyl sodium sulfosuccinate as the surfactant. The results are comparable.

EXAMPLE XIII

The procedures of Example I are followed substantially as set forth therein with the exception that the emulsion contains about 35 grams of sodium polyoxyethylene ether dodecyl alcohol sulfate. The results are comparable.

Having now described the invention in specific detail and exemplified the manner in which it may be carried into practice, it will be readily apparent to those skilled in the art that innumerable variations, applications, modifications, and extensions of the basic principles involved may be made without departing from its spirit and scope.

What is claimed is:

1. A method of applying an aqueous resin binder dispersion in a specific print pattern of intermittently spaced binder areas to a porous, absorbent fibrous sheet material and controlling the spread of migration of said aqueous resin binder dispersion on said porous absorbent fibrous sheet material which comprises: preparing a stable resin-liquid dispersion having a pH of greater than 7 and comprising from about 0.1 to 75 percent emulsion polymerized resin solids, from about 0.1 to about 5 percent by weight of the resin solids of a surfactant, and from about 1 to about 10 percent by weight of the resin solids of a polyacrylic acid-polyacrylamide copolymer having the following structural formula:

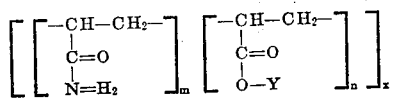

wherein
$m+n=100$
$m=10$ to 90
$n=90$ to 10
$y=$ a cation selected from the group consisting of Na, K, Li, $NH_3$ and H
$x=$ the number of monomeric units to bring the molecular weight within the range of from about 100,000 to about 1,000,000 applying said aqueous resin binder dispersion in a specific print pattern of intermittently spaced binder areas to a porous absorbent fibrous sheet material; and substantially simultaneously lowering the pH of the aqueous resin binder dispersion to less than 7 by contacting the same with an acidic material, whereby the resin binder solids immediately coagulate and precipitate on said fibrous sheet material in the form of the specific print pattern of intermittently spaced binder areas with a minimum of lateral spread or migration.

2. A method as defined in claim 1 wherein the resin binder dispersion is applied with low pressure to the porous absorbent fibrous sheet materials whereby the resin binder remains substantially solely on the surface thereof with a minimum of lateral spread or migration.

3. A method as defined in claim 1 wherein the resin binder dispersion is applied with heavy pressure to the porous absorbent fibrous sheet materials whereby the resin binder penetrates through the porous absorbent fibrous sheet materials with a minimum of lateral spread or migration.

4. A method as defined in claim 1 wherein the degree of hydrolysis of the polyacrylic acid-polyacrylamide copolymer is from about 10 percent to about 90 percent, the value of $m$ is from about 10 to about 70, and the value of $n$ is from about 90 to about 30.

5. A method as defined in claim 1 wherein the molecular weight of the polyacrylic acid-polyacrylamide copolymer is from about 300,000 to about 500,000.

6. A method as defined in claim 1 wherein the polyacrylic acid-polyacrylamide copolymer is present in an amount of from about 2 percent to about 8 percent by weight of the resin solids.

7. A method as defined in claim 1 wherein the resin-liquid dispersion comprises from about 15 percent to about 50 percent by weight emulsion polymerized resin solids.

8. A method as defined in claim 1 wherein the surfactant is anionic.

9. A method as defined in claim 1 wherein the surfactant is cationic.

10. A method as defined in claim 1 wherein the surfactant is nonionic.

11. A method as defined in claim 1 wherein the acidic material is acetic acid.

12. A method as defined in claim 1 wherein the porous, absorbent fibrous sheet materials are pretreated with an acidic material to lower its pH to less than 7 and to give it sufficient acidity as to bring the pH of the resin-liquid dispersion deposited thereon to a pH of below 7.

13. A method as defined in claim 12 wherein the acedic material is acetic acid. by the presence of the bafric layer. Next, clamping means 25 is sewn or stapled around the edge of cover layer 21 onto strip 23. Thereafter, insert 15 comprises the aforementioned construction and may be readily placed onto chair support 9 and clamping means 25, snapped over flared edge 13 of chair support 9 to place insert 15 in tight anchoring engagement with chair support 9.

What is claimed is:

1. A replaceable seat insert for a flare-edged fully supported type chair comprising in combination:
   a. a rigid yet flexible base conforming to the contour and to the nonflared outline of said chair support for positioning against said chair support, said base having at least one aperture in the deepest drawn area thereof;
   b. a cushion layer comprising a relatively thin layer of open-celled flexible foam adhered to the opposite surface of said base;
   c. a nonwrinkling and nontearable cover layer comprising a fabric-backed, expanded sheet of flexible polymeric material adhered by its fabric-backed side to said cushion layer and being uniformly slightly larger in area than said base so as to provide an overlapping strip of said material extending slightly beyond the periphery of said base and said cushion layer; and
   d. resilient clamping means joined to said overlapping strip of cover layer for anchoring engagement with the flare edge of said chair support.

2. The insert of claim 1 wherein said base comprises a vacuum formable sheet of thermoplastic polymer.

3. The insert of claim 2 wherein said vacuum formable sheet of thermoplastic polymer is acrylonitrile-butadiene styrene resin.

4. The insert of claim 1 wherein said base is roughened on the surface in adherence with said cushion layer to enhance adhesion thereto.

5. The insert of claim 1 wherein said cushion layer is adhered to said base with a contact-type adhesive.

6. The insert of claim 1 wherein said cushion layer comprises a flexible polyurethane foam.

7. The insert of claim 1 wherein said cover layer comprises a vacuum formable sheet of nonwrinkling and nontearable expanded vinyl polymer.

8. The insert of claim 7 wherein said cover layer comprising a vacuum formable sheet of expanded vinyl polymer is backed with a knitted material.

9. The insert of claim 8 wherein said knitted material is a nylon knit material.

10. The insert of claim 1 wherein said cover layer is adhered to said cushion layer with a contact-type cement.

11. The insert of claim 1 wherein said resilient clamping means comprises a polyvinyl chloride-based extrusion in the general shape of a question mark wherein the major hook-shaped portion clasps the flared edge of said chair support and wherein said minor hook-shaped portion is joined to said cover layer.

* * * * *

PO-1050
(5/69)

UNITED STATES PATENT OFFICE
CERTIFICATE OF CORRECTION

Patent No. 3,647,507    Dated March 7, 1972

Inventor(s) Charles Ray Ashcraft

It is certified that error appears in the above-identified patent and that said Letters Patent are hereby corrected as shown below:

In Column 2, line 39, "will flared-edged" should read ---- will vary ----.

In Column 2, line 42, delete "a" after The Surfactants.

In Column 3, line 61, delete 1/2.

In Column 4, line 11, "of range" should read ---acidic range---.

In Column 4, line 72, delete the word "intertwine".

In Column 5, line 1, delete the word "casing" after Example 11.

In Column 5, line 12, delete 1/2 after Example 111.

In Column 6, line 2, "ensure" should read ---insure---.

In Column 7, line 35, delete "by the presence of the bafric layer.......to Column 8, line 44, cover layer".

Signed and sealed this 24th day of October 1972.

(SEAL)
Attest:

EDWARD M. FLETCHER, JR.
Attesting Officer

ROBERT GOTTSCHALK
Commissioner of Patents